US009641631B2

(12) United States Patent
Smith, IV et al.

(10) Patent No.: US 9,641,631 B2
(45) Date of Patent: May 2, 2017

(54) INTEGRATED PERSONALIZED CONTENT RECOMMENDATION AND MANAGEMENT SYSTEM AND METHOD

(71) Applicants: Bartlett Wade Smith, IV, Madison, MS (US); Victor H. Meena, Jr., Jackson, MS (US); Allison A. Talley, Ridgeland, MS (US)

(72) Inventors: Bartlett Wade Smith, IV, Madison, MS (US); Victor H. Meena, Jr., Jackson, MS (US); Allison A. Talley, Ridgeland, MS (US)

(73) Assignee: CELLULAR SOUTH, INC. DBA C SPIRE WIRELESS, Ridgeland, MS (US)

( * ) Notice: Subject to any disclaimer, the term of this patent is extended or adjusted under 35 U.S.C. 154(b) by 316 days.

(21) Appl. No.: 13/676,861

(22) Filed: Nov. 14, 2012

(65) Prior Publication Data

US 2014/0136616 A1    May 15, 2014

(51) Int. Cl.
*G06F 15/16* (2006.01)
*H04L 29/08* (2006.01)
(Continued)

(52) U.S. Cl.
CPC .............. *H04L 67/22* (2013.01); *H04W 4/18* (2013.01); *H04W 4/206* (2013.01)

(58) Field of Classification Search
CPC .............. G06Q 30/0269; G06Q 30/02; G06F 17/30598; H04L 67/22; H04L 67/2838; H04W 4/18; H04W 4/206

USPC ........... 709/203, 217, 204; 705/14.48, 26.1; 725/14; 707/736; 710/18; 706/46; 455/414.1
See application file for complete search history.

(56) References Cited

U.S. PATENT DOCUMENTS 4,996,642 A    2/1991  Hey
5,583,763 A   12/1996  Atcheson et al.
(Continued)

OTHER PUBLICATIONS

StumbleUpon—http://www.stumbleupon.com/.
(Continued)

*Primary Examiner* — Dustin Nguyen
(74) *Attorney, Agent, or Firm* — Steptoe & Johnson LLP

(57) ABSTRACT

The integrated personalized content recommendation and management system aggregates content across multiple third-party websites and applications to be presented to said user based to generate personalized content recommendations. The system utilizes a unique profile associated with a particular user to generate the personalized content recommendations, and additionally, the system may seamlessly propagate the user's profile across multiple third-party websites and applications, and build social instructions based on the user's profile. The integrated personalization content recommendation and management system and method may provide an online recommendation and social networking service that delivers to users personalized content, social and/or product recommendations derived from participating electronic mediums (e.g. web sites, applications and mobile devices). The personalized content or product inventory may be derived from participating consumer or commercial web sites and web and mobile based applications.

18 Claims, 4 Drawing Sheets

(51) Int. Cl.
*H04W 4/18* (2009.01)
*H04W 4/20* (2009.01)

(56) References Cited

U.S. PATENT DOCUMENTS

| | | | |
|---|---|---|---|
| 5,710,884 A | 1/1998 | Dedrick | |
| 5,749,081 A | 5/1998 | Whiteis | |
| 5,933,827 A | 8/1999 | Cole et al. | |
| 6,014,638 A | 1/2000 | Burge et al. | |
| 6,029,195 A | 2/2000 | Herz | |
| 6,185,614 B1 | 2/2001 | Cuomo et al. | |
| 6,230,153 B1 | 5/2001 | Howard et al. | |
| 6,385,619 B1 | 5/2002 | Eichstaedt et al. | |
| 6,757,691 B1 | 6/2004 | Welsh et al. | |
| 6,895,406 B2 | 5/2005 | Fables et al. | |
| 6,912,505 B2 | 6/2005 | Linden et al. | |
| 6,922,685 B2 | 7/2005 | Greene et al. | |
| 7,565,630 B1 | 7/2009 | Kamvar et al. | |
| 7,653,761 B2* | 1/2010 | Juster et al. | 710/18 |
| 8,180,776 B2 | 5/2012 | Haveliwala et al. | |
| 8,615,442 B1* | 12/2013 | Kapur et al. | 705/26.1 |
| 2002/0198882 A1 | 12/2002 | Linden et al. | |
| 2009/0163183 A1* | 6/2009 | O'Donoghue et al. | 455/414.1 |
| 2011/0066674 A1* | 3/2011 | Piepenbrink et al. | 709/203 |
| 2013/0007198 A1* | 1/2013 | Gupta et al. | 709/217 |
| 2013/0036191 A1* | 2/2013 | Fink et al. | 709/217 |
| 2013/0103628 A1* | 4/2013 | Skelton et al. | 706/46 |
| 2013/0275210 A1* | 10/2013 | Johnson | 705/14.48 |
| 2014/0032656 A1* | 1/2014 | Hyman | G06Q 30/02 709/204 |
| 2014/0215507 A1* | 7/2014 | Wouhaybi et al. | 725/14 |
| 2014/0236943 A1* | 8/2014 | Li et al. | 707/736 |

OTHER PUBLICATIONS

SimilarWeb—http://www.similarweb.com/.
Yoono—http://www.yoono.com/.
Youlicit—http://www.crunchbase.com/company/youlicit.
Social Mention—http://socialmention.com/.
Trackur—http://www.trackur.com/.
Amazon Recommendations—http://www.amazon.com/gp/help/customer/display.html/ref=help_search_1-1?ie=UTF8&nodeId=16465251&qid=1367006534&sr=1-1.
Google AdSense Program—https://accounts.google.com/ServiceLogin?service=adsense&rm=hide&nui=15&alwf=true<mpl=adsense&passive=true&continue=https://www.google.com/adsense/gaiaauth2&followup=https://www.google.com/adsense/gaiaauth2&hl=en_US.

* cited by examiner

INTEGRATED PERSONALIZED CONTENT RECOMMENDATION AND MANAGEMENT SYSTEM AND METHOD

TECHNICAL FIELD

The present invention is directed to an integrated system and a method that generates personalized content recommendations for a user.

BACKGROUND

There are currently several computer-based systems which manage a user's online content choices and which provide recommendations of items to the user. Additionally, users utilize various communications media, which may include mobile messages, email messages, as well social network applications such as Facebook, Twitter, Linked-in, Google+ network applications to share content from various sources with other users.

However, users of such systems may still be overwhelmed by the content available across various websites and may still need to look to many different sources to consume their desired content. Such users would benefit from a service which would present them with more relevant and targeted content aggregated from across multiple unrelated websites and applications. Similarly, the automatic generation of a user's profile and seamless propagation of a user's profile across multiple third-party websites and applications and building of social instructions based on the user's profile would further enhance a user's online experience. Additionally, publishers of these websites would benefit from providing access to more relevant and targeted content on content aggregators, social networks and personalization services.

SUMMARY

In general, a method that generates personalized content recommendations for a user based on a user's profile information can seamlessly propagate a user's profile across multiple third-party websites and applications to aggregate content across these websites and applications.

The integrated personalized content recommendation and management system can aggregate content across multiple third-party websites and applications to be presented to said user to generate personalized content recommendations. The personalized content may be aggregated from various communications media, which may include mobile messages, email messages, as well social network applications such as Facebook, Twitter, Linked-in, Google+network. The system may utilize a unique profile associated with a particular user to generate the personalized content recommendations, and additionally, the system may seamlessly propagate the user's profile across multiple third-party websites and applications, and build social instructions based on the user's profile.

The integrated personalized content recommendation and management system may include a user profile creation and management module, an analytics platform module, a personalization button generation module, a user profile repository, and the friend interaction repository, which may be integrated with each other. The system may additionally include a login validation module and a developer portal dashboard module. The system may aggregate content across multiple third-party websites and applications, and may present said content to a user based on the generated personalized content recommendation, and may facilitate seamless communication and sharing of associated data and content between the system and the third-party websites and applications. A personalization button generation module may facilitate the generation of targeted content to users based on said system generated content recommendations.

The integrated personalization content recommendation and management system and method may provide an online recommendation and social networking service that delivers to users personalized content, social and/or product recommendations derived from participating electronic mediums (e.g. web sites, applications and mobile devices). The personalized content or product inventory may be derived from participating consumer or commercial web sites and web and mobile based applications The system may also include a developer portal dashboard module, which may prompt a publisher to add a system generated button to said publisher's websites and/or applications in order to connect said websites and/or applications with a network of said system. The developer portal dashboard module may generate analytics from a specified time period to measure a system generated button's effect on access to particular third party websites and applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The details of one or more embodiments are set forth in the following detailed description of the invention and the accompanying drawings. Other objectives, features, and advantages of the invention will be more readily understood upon consideration of the following Detailed Description of the invention, taken in conjunction with the accompanying drawings, and with the claims.

DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION

A detailed explanation of the system and method according to the preferred embodiments of the present invention are described below.

The embodiments may take the form of a hardware embodiment, a software embodiment, or an embodiment combining software and hardware. In one embodiment, the present invention takes the form of a computer-program product that includes computer-useable instructions embodied on one or more computer-readable media.

The various integrated personalized content recommendation and management techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document. Various computer-based systems, methods and implementations in accordance with the described technology are presented below.

Figure 1:
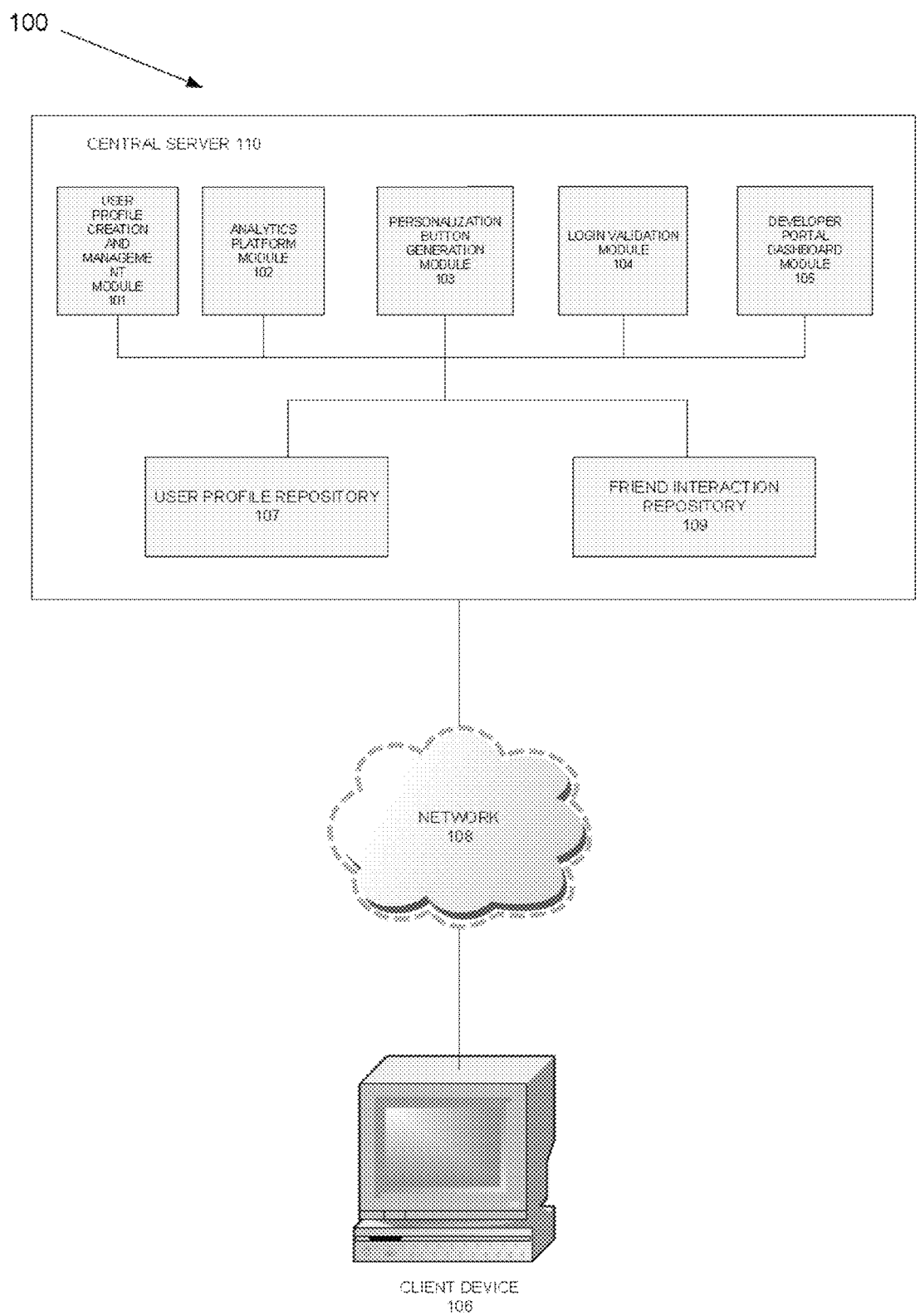
FIG. 1 illustrates an exemplary computer-implemented personalized content recommendation and management system and its components consisting therein.

Referring to the personalized content recommendation and management system 100 shown in FIG. 1, in an embodiment, the centralized server 110, the client device 106, the user profile creation and management module 101, the analytics platform module 102, the personalization button generation module, 103, the login validation module 104, the developer portal dashboard module 105, the user profile repository 107, and the friend interaction repository 109 may include a general-purpose computer and can have an internal or external memory for storing data and programs such as an operating system (e.g., DOS, Windows 2000™, Windows XP™, Windows NT™, OS/2, UNIX or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, in another embodiment, application programs can be externally stored in or performed by one or more device(s) external to the general-purpose computer. In an embodiment, the user profile module 101, the analytics platform module 102, the personalization button generation module 103, the login validation module 10r, and the developer portal dashboard module 105 may be application programs.

In addition, client device 106 may be or can include a desktop computer, a server, a laptop computer or other mobile computing device, a network-enabled cellular telephone (with or without media capturing/playback capabilities), wireless email client, or other client, machine or device to perform various tasks including Web browsing, search, electronic mail (email) and other tasks, applications and functions.

The general-purpose computer may include a central processing unit (CPU) for executing instructions in response to commands, and a communication device for sending and receiving data. One example of the communication device is a modem. Other examples include a transceiver, a communication card, a satellite dish, an antenna, a network adapter, or some other mechanism capable of transmitting and receiving data over a communications link through a wired or wireless data pathway.

The general-purpose computer may also include an input/output interface that enables wired or wireless connection to various peripheral devices. Examples of peripheral devices include, but are not limited to, a mouse, a mobile phone, a personal digital assistant (PDA), a keyboard, a display monitor with or without a touch screen input, and an audiovisual input device. In another implementation, the peripheral devices may themselves include the functionality of the general-purpose computer. For example, the mobile phone or the PDA may include computing and networking capabilities and function as a general purpose computer by accessing a network and communicating with other computer systems. Examples of a network, such as network 108, include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

In one implementation, a processor-based system of the general-purpose computer can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or PROM) and associated socket, and other removable storage units and interfaces, which allow software and data to be transferred from the removable storage unit to the computer system.

In one embodiment, network 108 can also include a communications interface that allows software and data to be transferred between client device 106, central server 110, and the other components shown in system 100. The user profile creation and management module 101, the analytics platform module 102, the personalization button generation module 103, the login validation module 104, the developer portal dashboard module 105, the user profile repository 107, and the friend interaction repository 109 may also be stand-alone components that can communicate with each other, the centralized server 110, and/or the client device over network 108. Examples of communications interfaces can include a modem, a network interface (such as, for example, an Ethernet card), a communications port, and a PCMCIA slot and card. Software and data transferred via a communications interface may be in the form of signals, which can be electronic, electromagnetic, optical or other signals capable of being received by a communications interface. These signals may be provided to a communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer readable medium" are generally used to refer to media such as a removable storage device, a disk capable of installation in a disk drive, and signals on a channel. These computer program products may provide software or program instructions to a computer system.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media include computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Computer programs which may be associated with applications of the user profile creation and management module 101, the analytics platform module 102, the personalization button generation module,103, the login validation module 104 and the developer portal dashboard module 105 (also called computer control logic) may be stored in the main memory or secondary memory. Such computer programs can also be received via a communications interface. Such computer programs, when executed, may enable the computer system to perform the features as discussed herein. In particular, the computer programs, when executed, may enable the processor to perform the described techniques. Accordingly, such computer programs may represent controllers of the computer system.

In an embodiment where the elements are implemented using software, the software can be stored in, or transmitted via, a computer program product and loaded into a computer system using, for example, a removable storage drive, hard drive or communications interface. The control logic (software), when executed by the processor, may cause the processor to perform the functions of the techniques described herein.

In another embodiment, the elements may be implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements may be implanted using a combination of both hardware and software.

In another embodiment, the computer-based methods can be accessed or implemented over the World Wide Web by providing access via a Web Page to the methods described herein.

Accordingly, the Web Page may be identified by a Universal Resource Locator (URL). The URL may denote both a server and a particular file or page on the server. In this embodiment, it is envisioned that a client computer system, which may be the client device 106, may interact with a browser to select a particular URL, which in turn may cause the browser to send a request for that URL or page to the server identified in the URL. Typically, the server may respond to the request by retrieving the requested page and transmitting the data for that page back to the requesting client computer system, which may be the client device 106 (the client/server interaction may be typically performed in accordance with the hypertext transport protocol or HTTP). The selected page may then be displayed to the user on the client's display screen. The client can then cause the server containing a computer program to launch an application, for example, to perform an analysis according to the described techniques. In another implementation, the server can download an application to be run on the client to perform an analysis according to the described techniques.

Referring to FIG. 1, the integrated personalized content recommendation and management system 100 may include a user profile creation and management module 101, an analytics platform module 102, a personalization button generation module 103, a user profile repository 107, and the friend interaction repository 109, which may be integrated with each other. The system may aggregate content across multiple third-party websites and application, and may present said content to a user based on the generated personalized content recommendations. The personalized content may be aggregated from various communications media, which may include mobile messages, email messages, as well social network applications such as Facebook, Twitter, Linked-in, Google+ network. The system may also organize said generated personalized content based on the source, topic and/or date of the content amongst other categories.

One or more of the user profile creation and management module 101, analytics platform module 102, a personalization button generation module 103, a user profile repository 107, and the friend interaction repository 109 may be integrated within each other, the centralized server 110, or the client device 106. For example, the user profile creation and management module 101, analytics platform module 102 and personalization button generation module 103 may be the same module. In another example, the user profile repository 107, and the friend interaction repository 109 may be the same repository or located within the same database. In yet another example, the user profile creation and management module 101, analytics platform module 102 and personalization button generation module 103 may be application programs downloaded as part of a mobile application to client device 106. In such example, the user profile creation and management module 101, analytics platform module 102 and personalization button generation module 103 may communicate to the other components in the system 100 over network 108. In another embodiment, one or more of the user profile creation and management module 101, an analytics platform module 102, a personalization button generation module 103, a user profile repository 107, and the friend interaction repository 109 may be stand-alone components that can communicate with each other, the centralized server 110, and/or the client device 106 over network 108.

The user profile creation and management module 101 may create, stores and manage user profile information in the user profile repository 107. Such user profile information may be automatically retrieved and used by the system for further personalized content generation and management by the system. The user profile repository 107 may be a repository, such as a database, which serves as a storage location for a user's account information, as well as information about a user's online behavior and information about system generated personalized content. A user may manually provide user-specific profile information, and accordingly, user profile creation and management module 101 may generate a user's profile based on instructions from said user. Additionally, the user profile creation and management module may automatically generate a user's profile based on a user's online behavior including sites visited, links and articles viewed and liked by a user, and sites visited and links and article viewed and liked by members of a user's social network. In storing information about the personalized content presented to the user, the user profile creation and management module may manage and store user profile information, and accordingly may return a result of friend entities.

The integrated personalization content recommendation and management system may also include an analytics platform module 102 may generate personalized content recommendations for a user based on the user's profile information which may be stored in the user profile repository 107. The analytics platform module 102 may include a decision engine, which may utilize an algorithm to generate the personalized content recommendations. Content and/or product recommendations delivered to users and stored in user profile system may be shared with analytic platform module 102, which in turn may render personalized recommendations of the user of that site or application.

The system may utilize the algorithm to seamlessly provide and optimize the system generated online recommendations to users across multiple websites. The algorithm may utilize social networking data may be used to affect content recommendations, for example, to extract particular topics. The following facebook social networking data may be used to affect personalized content recommendations: interest tracking (weighted against topics); language processing on posts and comments by the user; language processing on posts and pages the user likes; language processing on a user's profile, and related fields (education, work, interests); category of pages that a user likes; interaction tracking (weighted against articles); whether an article URL is contained in posts written or liked by user; and whether the user has liked an article's open graph representation. The following twitter social networking data may be used to affect personalized content recommendations: interest tracking (weighted against topics); language processing on tweets written or made a favorite by a user; whether the user is following known celebrities; language processing on user's bio; interaction tracking (weighted against articles); and whether an article URL is contained in tweets written or made a favorite by a user.

The analytics platform module 102 may also include a management dashboard and a reporting dashboard to manage and track the personalized content recommendations generated by the system. Furthermore, the system may facilitate mobile engagements, as the analytics platform module 102 may generates personalized content recommendations for a user by utilizing a user's geolocation, and may also generate product recommendations for a user.

The personalization button generation module may facilitate the generation of targeted content to users based on said system generated content recommendations. Accordingly, the system may utilize a clickable button and will be integrated by participating third party consumer or commercial web sites and applications. The system generated button may be displayed on adopting sites. For example, once a new publisher implements the button, a message may be posted via one of its associated social networks. A user may hover over the button to provide a quick overview of the benefits of clicking the button. When a user interacts with a certain number of articles of a certain type, a message may be shared providing a link to one of the article's via a user's social network.

The integrated personalized content recommendation and management system may also include a login validation module 104. Using the login validation module 104, a user's system account may be accessed by a system log in and/or a user's social network login through which a user authorizes the system to access said user's personal data. The system login may include a user's email address.

Additionally, the system may include a developer portal dashboard module 105, which may prompt a publisher to add a system generated button to said publisher's websites and/or applications in order to connect said websites and/or applications with a network of said system. Furthermore, the developer portal dashboard module may generate analytics from a specified time period to measure a system generated button's effect on access to particular third party websites and applications.

The integrated personalized content recommendation and management system may also include a friend interaction repository 109 wherein said repository may query members of a user's social networks access to URLs. The friend interaction repository 109 may be a repository, such as a database, which may serve to allow the system to directly query all likes of a particular URL. This repository may include an internal database that is used to allow for the easy traversal of such relationships; additionally, the structure could be modeled in a non-graph database as well. In order for the system to retrieve the associated information and populate the friend interaction repository with the required social network information, a background process may be scheduled upon logging in with a social network access token.

Figure 2:
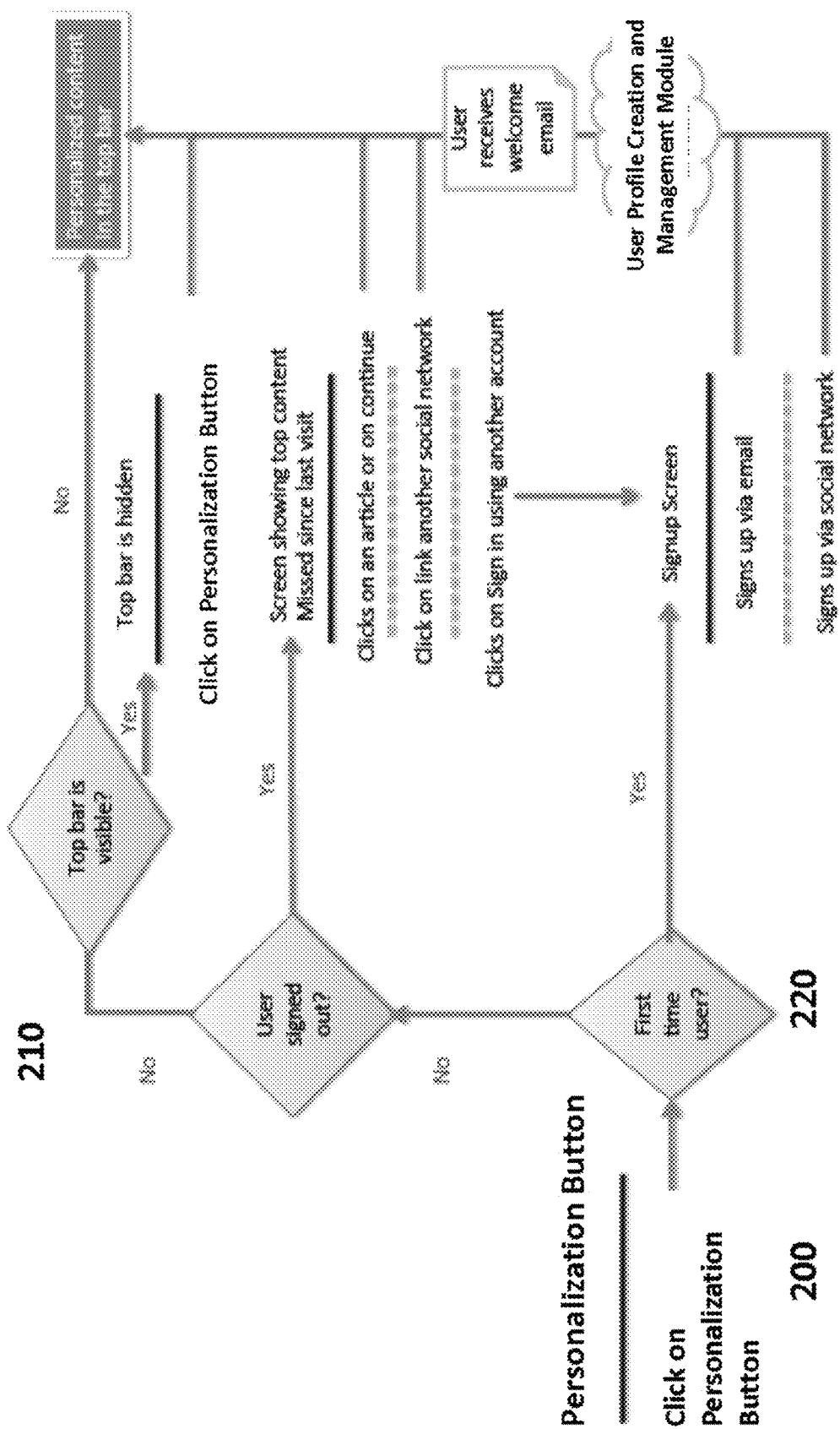
FIG. 2 provides a flow chart depicting personalization button generation module processing to facilitate the generation of targeted content to users based on said system generated content recommendations.

Referring to FIG. 2, the personalization button generation module 103 facilitates the generation of targeted content to users based on said system generated content recommendations. The system may utilize a clickable button and will be integrated by participating third party consumer or commercial web sites and applications. The system generated button 200 may be displayed on adopting sites. For example, once a new publisher implements the button, a message may be posted via one of its associated social networks. A user may hover over the button to provide a quick overview of the benefits of clicking the button 210. When a user interacts with a certain number of articles of a certain type, a message may be shared providing a link to one of the articles via a user's social network.

A system account that may be accessed by a user 220 by system log in, which may be associated with a user's email address and/or by a user's their social network log in, which may allow users to connect to the system with their favorite social networks. A user may create a user's own account using email address and password. The system may automatically generate a user's profile based on a user's online behavior associated with the user's particular logon identifier.

When a user logs on to the system, the system may present top stories recommended to the user. Additionally, the user may be prompted by more social networks to improve their personalized experience. The system may also include a user personalized system page, which may be used to manually modify user settings, and additionally, the system itself can generate and modify user specific settings.

Figure 3:
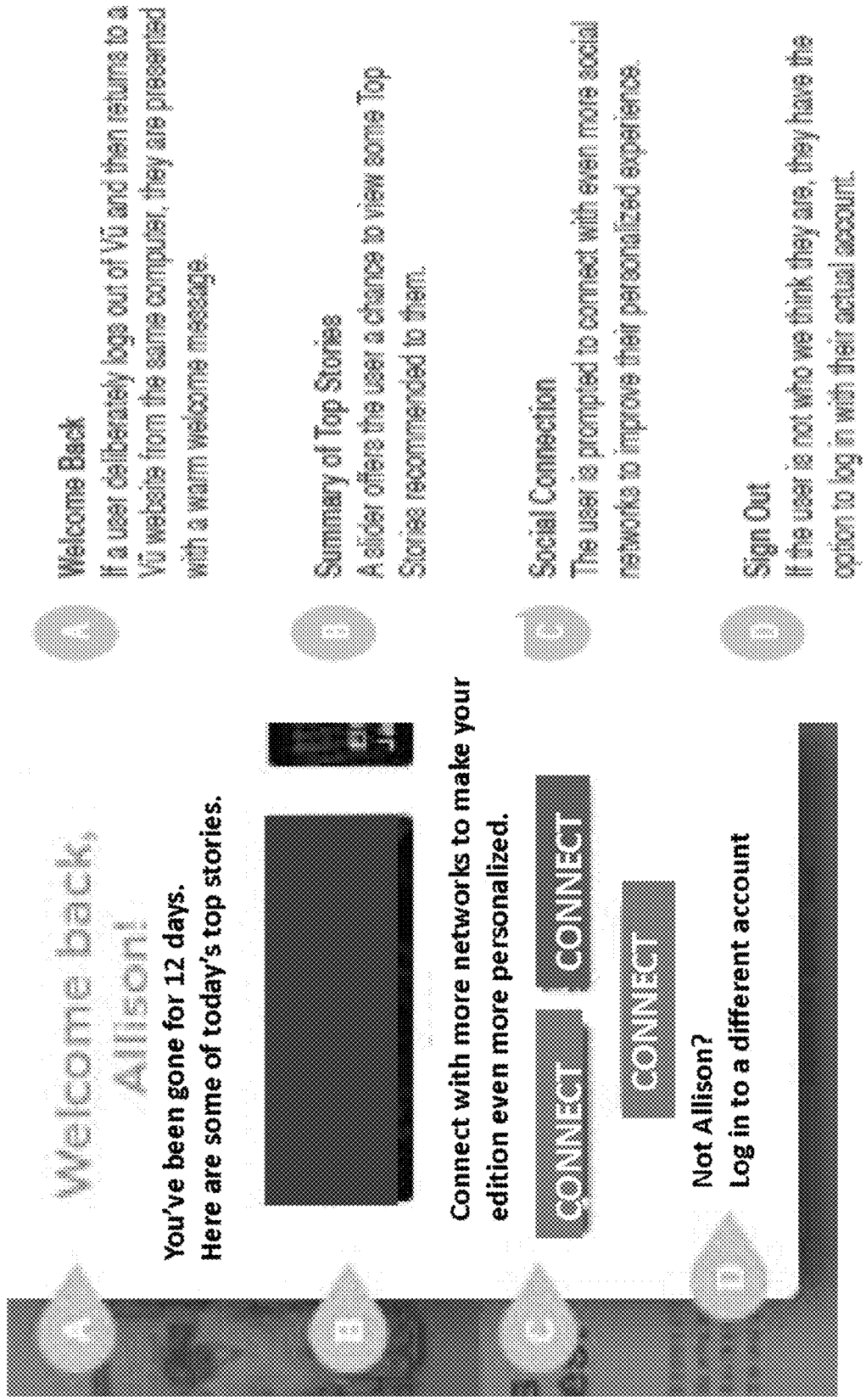
FIG. 3 depicts the visual representation of the login validation module and depiction of system generation of personalized content recommendations

Referring to FIG. 3, a large featured content site may pull in custom content from across the system network personalized for the particular user 300. The system may present the user with an aggregate of content from across the system network to what system and/or user has identified as their favorite topics. Additionally, the most popular articles form the entire system network may be presented to users to provide users with an opportunity to interact with content from beyond their own recommended set. Users may click on more information to see information about the personalized content presented to them. By looking at the "more info" section of an article will show users friends who have interacted with a specific article. A user may also click on an article summary and the entire article will be displayed.

The system may automatically send and store the behavior of a user with presented content in the user profile repository. A user may also be presented with the option to indicate the relevance of a presented article, the information of which may also be stored by the system in the user profile repository.

Figure 4:
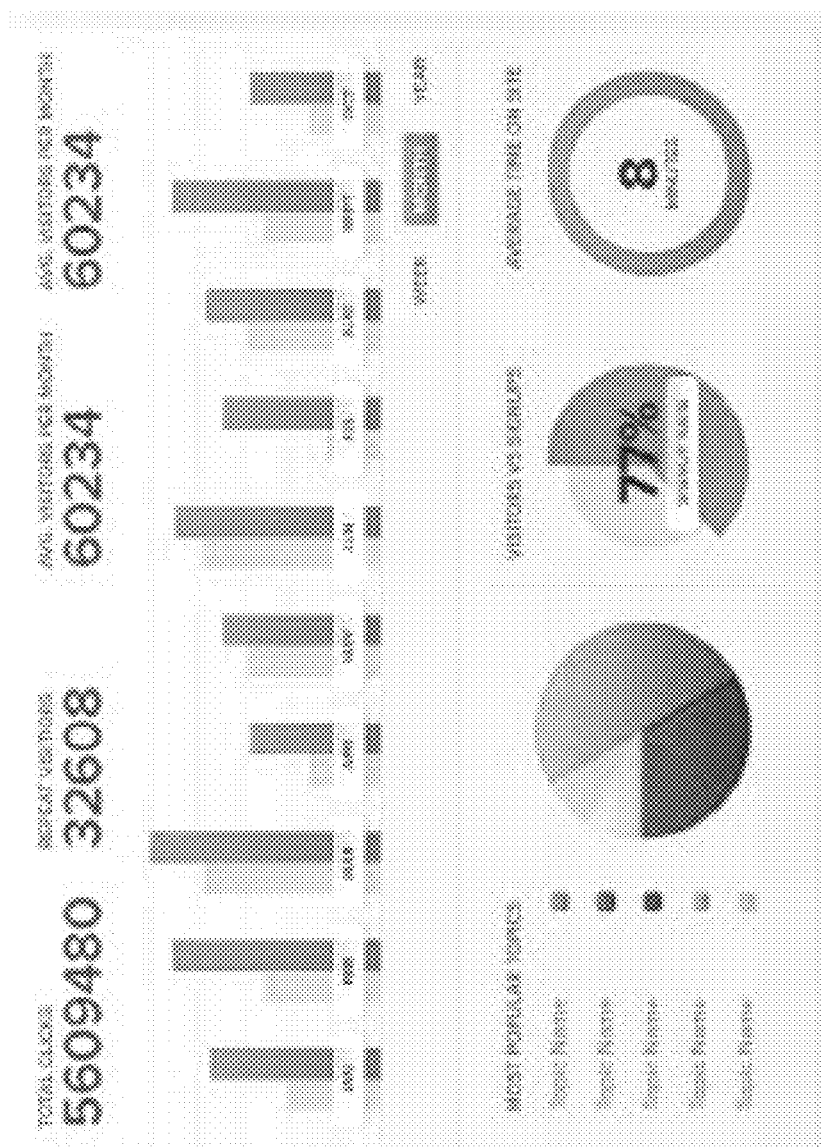
FIG. 4 depicts a visual representation of the developer portal dashboard module.

Referring to FIG. 4, the developer portal dashboard module 105, may prompt a publisher to add a system generated button to said publisher's websites and/or applications in order to connect said websites and/or applications with a network of said system by linking to a developer portal. The developer portal dashboard module may generate analytics 400 from a specified time period to measure a system generated button's effect on access to particular third party websites and applications. The system allows for a developer to specify the range of time from which the analytics are pulled from. Additionally, the developer portal dashboard module may generate and present developers with several different data points so that they can see firsthand how the system button is affecting their readership and content access.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer-implemented personalized content recommendation and management system comprising:
   a user profile repository located within a database;
   a user profile creation and management module which provides access to manually modify user settings;
   an analytics platform module; and
   a personalization button generation module;
   a developer portal dashboard module wherein said module prompts a publisher to add a system generated button to said publisher's websites and/or applications in order to connect said websites and/or applications with a network of said system;
   wherein the user profile creation and management module creates, stores and manages user profile information in the user profile repository;
   wherein the analytics platform module:
      comprises a decision engine, management dashboard, and reporting dashboard; and
      utilizes an algorithm to generate personalized content recommendations for a user based on said user's profile information;
   wherein the personalization button generation module facilitates the generation of targeted content to users based on said system generated content recommendations; and
   wherein the computer-implemented personalized content recommendation and management system:
   seamlessly propagates a user's profile across multiple third-party websites and applications;
   builds social instructions based on said user's profile;
   aggregates content across multiple third-party websites and applications to be presented to said user based on the generated personalized content recommendations, and organizes said aggregated content; and
   stores information about said personalized content to be utilized by said system in the generation of said user's personalized content recommendations;
   wherein the a user profile repository, the user profile creation and management module, the analytics platform module and the personalization button generation module are integrated with each other; and
   a login validation module wherein said module facilitates a user's system account to be accessed by a system log in and/or a user's social network login through which a user authorizes the system to access said user's personal data.

2. The computer-implemented personalized content recommendation and management system of claim 1 wherein the user's system log in comprises a user's email address.

3. The computer-implemented personalized content and recommendation management system of claim 1 wherein said third-party websites and applications comprise social network applications and mobile applications.

4. The computer-implemented personalized content and recommendation management system of claim 1 wherein the analytics platform module generates personalized content recommendations for a user by utilizing a user's geolocation.

5. The computer-implemented personalized content and recommendation management system of claim 1 wherein the analytics platform module generates product recommendations for a user.

6. The computer-implemented personalized content and recommendation management system of claim 1 wherein the user profile creation and management module generates a user's profile based on instructions from said user.

7. The computer-implemented personalized content and recommendation management system of claim 1 wherein the user profile creation and management module automatically generates a user's profile based on a user's online behavior.

8. The computer-implemented personalized content and recommendation management system of claim 1 comprising a friend interaction repository located within the database wherein the system queries members of a user's social networks access to URLs and wherein query results are stored in the friend interaction repository.

9. The computer-implemented personalized content and recommendation management system of claim 1 wherein said developer portal dashboard module generates analytics from a specified time period to measure a system generated button's effect on access to particular third party websites and applications.

10. A computer-implemented personalized content recommendation and management method comprising:
   creating, storing and managing user profile information in the user profile repository;
   utilizing an algorithm to generate targeted personalized content recommendations for a user based on said user's profile information;
   seamlessly propagating a user's profile across multiple third-party websites and applications;
   building social instructions based on said user's profile;
   aggregating content across multiple third-party websites and applications to be presented to said user based on the generated personalized content recommendations, and organizing said aggregated content;
   storing information about said personalized content to be utilized by said system in the generation of said user's personalized content recommendations;
   providing a developer portal dashboard wherein the developer portal dashboard prompts a publisher to add a system generated button to the publisher's websites and/or applications in order to connect the websites and/or applications with a network of the system;
   accessing a user's system account by a system log in and/or by a user's social network login thereby authorizing the system to access said user's personal data; and
   generating analytics from a specified time period to measure a system generated button's effect on access to particular third party websites and applications.

11. The computer-implemented personalized content recommendation and management method of claim 10 wherein the user's system log in comprises a user's email address.

12. The computer-implemented personalized content and recommendation management method of claim 10 wherein said third-party websites and applications comprise social network applications and mobile applications.

13. The computer-implemented personalized content and recommendation management method of claim 10 comprising generating personalized content recommendations for a user by utilizing a user's geolocation.

14. The computer-implemented personalized content and recommendation management method of claim 10 comprising generating product recommendations for a user.

15. The computer-implemented personalized content and recommendation management method of claim 10 comprising generating a user's profile based on instructions from said user.

16. The computer-implemented personalized content and recommendation management method of claim 10 comprising automatically generating a user's profile based on a user's online behavior.

17. The computer-implemented personalized content and recommendation management method of claim 10 comprising querying members of a user's social networks access to URLs.

18. The computer-implemented personalized content and recommendation management method of claim 10 comprising prompting a publisher to add a system generated button to said publisher's websites and/or applications in order to connect said websites and/or applications with a network of said system.

* * * * *